L. VOGGENREITER.
RULE.
APPLICATION FILED MAY 29, 1911.
1,028,507.
Patented June 4, 1912.
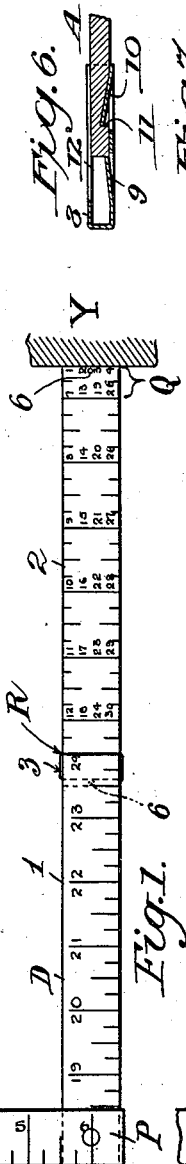
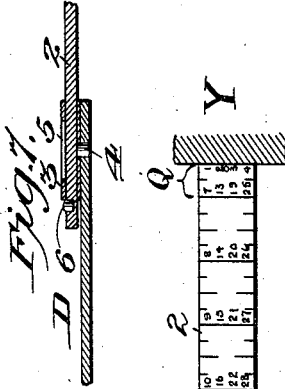
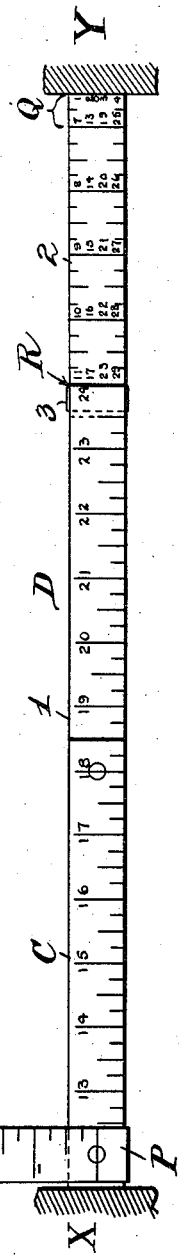
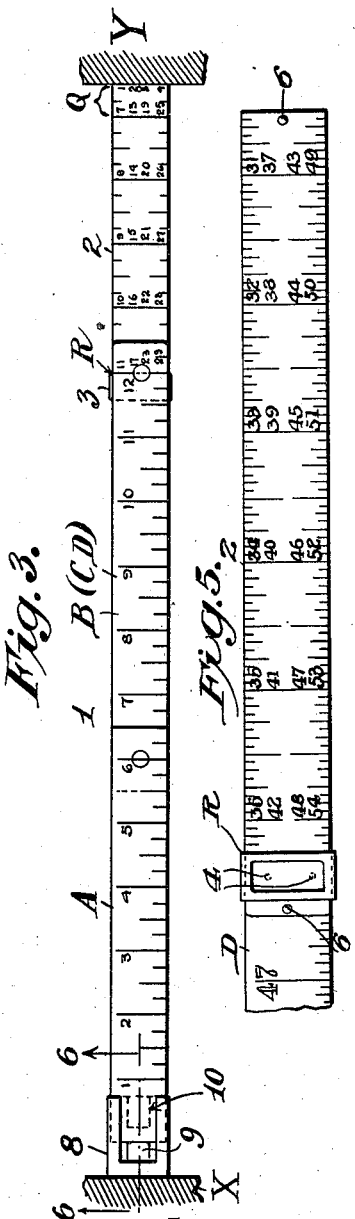
Attest:
Edna Q. Moreland
Alan C. McDonnell
Inventor:
by Louis Voggenreiter
E. W. Scherr Jr. Atty.

UNITED STATES PATENT OFFICE.

LOUIS VOGGENREITER, OF NEW YORK, N. Y.

RULE.

1,028,507.  Specification of Letters Patent.  Patented June 4, 1912.

Application filed May 29, 1911. Serial No. 630,161.

*To all whom it may concern:*

Be it known that I, LOUIS VOGGENREITER, a citizen of the United States, residing at New York, in the county of New York and State of New York, have invented certain new and useful Improvements in Rules, of which the following is a specification.

My present invention relates to improvements in rules that are made up of a plurality of sections including the regular folding rule where the sections are pivotally connected.

The purpose of my improvements is to adapt rules of this type to make inside measurements to which as now constructed they are not adapted. Thus, if a carpenter wishes to measure the distance between the sides of a window frame where the sash slides, he cannot do so directly with the ordinary rule because the sides of the frame are recessed and therefore the distance between them cannot be measured superficially by the ordinary rule, but must be measured by an inside-measuring rule if the carpenter is to determine the distance by a single measurement as distinguished from making several measurements and then making a calculation therefrom.

It is the purpose of my improvement or attachment to existing rules to make it possible for the user to measure directly inside measurements and in general distances between objects by a single operation without calculation.

One specific embodiment of the means by which I accomplish this is shown in the annexed drawings wherein—

Figure 1 is a partial view of a folding rule provided with my attachment, showing one section of said rule and my attachment in use for making an inside measurement between two objects; Fig. 2 is the same as Fig. 1 except that it shows two sections of the rule in use; and Fig. 3 is the same as Fig. 2 except that the left hand section of the rule in Fig. 3 is the section which is at the opposite end of the rule from the section provided with the attachment, as distinguished from being one of the middle sections of the rule which is the case in Fig. 2; Fig. 4 is a duplication on an enlarged scale of the devices shown at the right in Fig. 1; Fig. 5 is a view of the reverse or underside of the same devices; Fig. 6 is a sectional view on the line 6—6 in Fig. 3, looking in the direction of the arrows, to further illustrate an extensible piece which I provide as part of my improvements upon the opposite end of the rule from that which carries the main attachment; and Fig. 7 is a sectional view of the device of Fig. 5 to further illustrate the means by which I adjustably secure the main attachment to the rule. Figs. 1 to 3 are drawn to one-half scale and Figs. 4 to 7 are full scale.

I will now describe the devices of the drawings, reserving it to the claims to point out the novel features and to define the scope of the invention, it being understood that the claims will be given due range of equivalents.

1 designates a rule of the ordinary folding type which may have any desired length made up of pivotally connected sections. The rule shown is a short rule of this type, 24 inches long, supposed to be made up of four sections, each having an effective measuring length of six inches. The four sections are designated in the drawings A, B, C and D. When these designating letters appear in brackets it means that these sections of the rule underlie and are therefore concealed by the section designated by the letter which is outside the brackets. As in all folding rules, a fraction of a unit length (designated P in drawings) must be added to the pivotal ends of the sections beyond their pivots so as to provide the necessary stock to receive the pivots and hold the sections of the rule together. Thus, in the particular rule shown, each section measures six inches between pivots and a half inch of stock is provided beyond the pivots for pivoting the sections together. Since there is only one pivot in the end sections A and D, this means that they are six and one half inches long; and since there are two pivots in the intermediate sections B and C, this means that they are each seven inches long, so far as the particular rule illustrated is concerned. With this preface as to the general nature and make-up of folding rules, I will now proceed to describe my improvements.

2 is an adjustable extension or attachment which I provide on one end of the rule. Specifically, in the drawings, it takes the form of a graduated strip (that shown being about 6½ inches long) which is slidable endwise through a guide 3 secured on the free end of section D of the rule, with the result that said graduated extension 2 can be adjusted to extend to the desired distance beyond the end of the main rule. The actual form of the guide 3 is not essential and as shown consists of a piece of sheet metal bent to form a hollow band of rectangular cross section through which the extension 2 slides. The band is secured rigidly to the end of the section D by rivets 4, the upper side of the band being conveniently cut out with a rectangular opening 5 to conveniently permit the riveting.

6 designates pins at each end of the sliding extension 2 to engage the side edges of the band 3 to limit the reciprocation in both directions of the extension 2 and thereby prevent said extension from becoming disengaged from the guide and rule.

The extension 2 is graduated to give a direct reading therefrom of the combined length of one or more sections of the rule and the extension to whatever distance the latter is extended. Further, there are a plurality of sets of said graduations, one or another set of which is used to make the reading, depending upon the number of sections of the rule in use when making the measurement. Thus, in the rule of Figs. 1 to 4 inclusive, there are shown on the extension 2 four sets of these graduations designated respectively by the numerals 1, 2, 3 and 4 which appear at the far or distal end of the extension. The numeral 1 designates the first line of graduations ranging from 7 to 12 inches and beyond, the numeral 2 the second line ranging from 13 to 18 inches and beyond, etc.

To use the rule it will be applied between the two objects as shown, for example in Figs. 1 to 3 where the objects are designated X and Y. In Fig. 1 the distance between the objects is such that only one section of the rule can be used in conjunction with the extension 2 to make the measurement, the end of section D being held against the object X and the extension 2 being then slid outwardly until it abuts against the object Y, whereupon the distance between the objects is read at R directly from the set of graduations No. 1 on the extension 2, said reading being 12½ inches under the particular circumstances shown in Fig. 1. The reason that the reading is taken from the set of graduations No. 1 as distinguished from the others is because said set corresponds with and is to be used whenever only one of the sections of the rule is in use. On the other hand, when two sections of the rule are being used as in Figs. 2 and 3, then the reading is to be taken from the set of graduations No. 2, which is 17 inches under the particular circumstances shown in those figures. Similarly, when the three sections of the rule are in use, then the readings are taken from the set of graduations No. 3 and if four sections from the set of graduations No. 4.

Describing now the method of graduating the adjustable extension 2, it will be noted that the first unit "7, 13, 19, 25" of its different sets of graduations begins a half inch away from the end of the extension, which distance (marked Q in the drawings) is the complement of the fraction of a unit P by which the pivoted ends of the sections extend beyond their pivots in the particular sample of rule illustrated. Fig. 1 shows the importance of adding this fraction of a unit Q on the distal end of the extension 2 to complete the unit of which the fraction P is the other part, because section D in Fig. 1 having an effective measuring length of 6½ inches, it is necessary that the first unit 7 appearing on the extension should be located ½ inch from the end of the extension in order to make the combined length of said section D and the extension to amount actually to 7 inches when the graduation 7 on the extension registers with the point R at the end of the rule where all readings on the extension are made. Graduation 7 being in this way correctly placed on the extension, the other graduations for 8, 9, 10, etc., inches are regularly spaced from the graduation 7 as a starting point. The fractions P and Q being complements of each other, it of course follows that if in the given rule the fraction P were ⅝ of an inch, then Q would be ⅜ of an inch, and therefore the unit graduations on the extension would begin ⅜ of an inch from the end.

The section A of the ordinary folding rule, meaning the section which is at the opposite end of the rule from that carrying the adjustable extension 2, does not have any increment P on its free end and consequently to make the graduations on the extension apply correctly to measurements where this section A is used, I provide an extensible piece 8 slidably mounted on the free end of section A. This piece when extended increases the length of section A by a fraction of a unit equal to P. The only thing to remember is that said piece 8 must always be extended whenever rule section A is used, if a correct reading is to be obtained from the graduations on the extension 2. The provision of this extensible piece 8 makes all of the sections interchangeable so that it is immaterial which of them are used in making any particular measurement because the reading taken from the extension 2 will be equally accurate for all. Thus, making the measurement in Fig. 1 where one section D is used, the same reading would result if any of the other sections were used.

In Fig. 2 where sections C and D are used to give a reading of 17 inches, said reading would be the same if sections A and B were active, which is precisely the conditions shown in Fig. 3. The only necessary precaution is that above pointed out of operating the extensible piece 8 into its extended position so as to give the section A the same effective measuring length as the other sections.

The extensible piece 8 may take any preferred construction, that shown consisting of a metal slide fitting the end of the section A, the top of the slide having a pair of spring tongues 9 and 10 directed toward each other, the spring action being against the top of the section. A recess 11 is cut in the top of said section and the adaptation is such that when the extensible piece 8 is slid into its outer or measuring position, the tongue 10 abuts against the end of the recess 11 preventing the piece from being extended beyond the necessary half inch increment; whereas the other tongue 9 snaps inwardly so that its extremity engages against the end of the section and prevents the extensible piece from telescoping back upon the section. In short, the two tongues lock the extensible piece in its extended position, from which it is easily released when no longer wanted for measurement by pressing the tongue 9 from the underside through an opening 12 provided through the rear wall of the extensible piece, whereupon the extremity of said tongue 9 clears the end of the section A and the extensible piece can thereupon be telescoped back into its non-extended position on the section.

Referring back to the graduation of the adjustable extension 2, the reason why the units of the set of graduations No. 2 are increased by six over those of set 1 is that set 2 is read when using two sections of the rule (compare Figs. 2 and 3) which use increases the effective length of the rule by six inches over a use which includes only one section as in Fig. 1. In short, each additional section used gives a set increase of six inches (in the particular rule shown) in effective measuring length, hence the observed increase of six between the units of the respective sets of graduations Nos. 1, 2, 3 and 4. Fig. 5 shows a development of the same principle of graduation applied to a 48 inch rule supposed to have eight sections. The adjustable extension 2 of this larger rule will differ merely from that of the two foot rule heretofore described by adding thereto the four additional sets of graduations shown in Fig. 5, either on the same or opposite sides of the extension 2, the latter being the method adopted in the drawings. The units of these additional sets differ from each other and from the preceding sets by six for the reason above explained. Finally, they will be similarly used. Thus, if there be six sections of the rule used in making any given measurement in conjunction with the extension 2, then the reading will be taken from the set of graduations No. 6, said readings being made as above at the point R where the extension 2 projects beyond the end of the rule, the actual reading shown in Fig. 5 being $42\frac{1}{4}$ inches.

What I claim is:

1. The combination with a rule having a plurality of sections of an adjustable extension which latter is graduated to give a direct reading therefrom of the combined length of one or more sections of the rule and the extension to the distances that the latter is extended, there being plural sets of said graduations, one or another set of which is used to make the reading depending upon the number of sections in use when making the measurement.

2. The combination with a rule having a plurality of sections of an adjustable extension which latter is graduated to give a direct reading therefrom of the combined length of one or more sections of the rule and the extension to the distances that the latter is extended, there being plural sets of said graduations, one or another set of which is used to make the reading depending upon the number of sections in use when making the measurement, said sets of graduations being designated 1, 2, etc., set 1 being read when one section of the rule is in use, set 2 when two sections are in use, etc.

3. The combination with a folding rule in pivotally connected sections of an adjustable extension on one end of said rule, said extension being graduated to give a direct reading therefrom of the combined length of one or more sections of the rule and the extension to the distances that the latter is extended, there being plural sets of said graduations, one or another set of which is used to make the reading depending upon the number of sections in use when making the measurement, said sets of graduations being designated 1, 2, etc., set 1 being read when one section of the rule is in use, set 2 when two sections are in use, etc.

4. The combination with a folding rule in pivotally connected sections of an adjustable extension on one end of said rule, said extension being graduated to give a direct reading therefrom of the combined length of one or more sections of the rule and the extension to the distances that the latter is extended, there being plural sets of said graduations, one or another set of which is used to make the reading depending upon the number of sections in use when making the measurement, the fraction of a unit by which the pivoted ends of the sections extend beyond their pivots being uniform and the complement thereof being added to the distal end of the adjustable extension before its unit graduations begin.

5. The combination with a folding rule in pivotally connected sections of an adjustable extension on one end of said rule, said extension being graduated to give a direct reading therefrom of the combined length of one or more sections of the rule and the extension to the distances that the latter is extended, there being plural sets of said graduations, one or another set of which is used to make the reading depending upon the number of sections in use when making the measurement, the fraction of a unit by which the pivoted ends of the sections extend beyond their pivots being uniform and the complement thereof being added to the distal end of the adjustable extension before its unit graduations begin, and an extensible piece mounted on the distal end of the section which is at the opposite end of the rule from the aforesaid graduated adjustable extension, said piece when extended increasing the length of said section by the same fraction of a unit that the pivoted ends of the sections extend as aforesaid beyond their pivots.

6. The combination with a folding rule in pivotally connected sections of an adjustable extension on one end of said rule, said extension being graduated to give a direct reading therefrom of the combined length of one or more sections of the rule and the extension to the distances that the latter is extended, there being plural sets of said graduations, one or another set of which is used to make the reading depending upon the number of sections in use when making the measurement, said sets of graduations being designated 1, 2, etc., set 1 being read when one section of the rule is in use, set 2 when two sections are in use, etc., the fraction of a unit by which the pivoted ends of the sections extend beyond their pivots being uniform and the complement thereof being added to the distal end of the adjustable extension before its unit graduations begin, and an extensible piece mounted on the distal end of the section which is at the opposite end of the rule from the aforesaid graduated adjustable extension, said piece when extended increasing the length of said section by the same fraction of a unit that the pivoted ends of the sections extend as aforesaid beyond their pivots.

In testimony whereof I affix my signature in presence of two witnesses.

LOUIS VOGGENREITER.

Witnesses:
 E. W. SCHERR, Jr.,
 EDNA A. MORELAND.

---

Copies of this patent may be obtained for five cents each, by addressing the "Commissioner of Patents, Washington, D. C."